United States Patent
Motika et al.

(10) Patent No.: US 10,182,138 B2
(45) Date of Patent: Jan. 15, 2019

(54) SMART WAY OF CONTROLLING CAR AUDIO SYSTEM

(71) Applicant: QUALCOMM Incorporated, San Diego, CA (US)

(72) Inventors: Goutam Motika, Hyderabad (IN); Keemat Rai, Hyderabad (IN); Rajasekar Raja, Hyderabad (IN); Adiseshu Mylavaram, Tellapur (IN)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 14/991,232

(22) Filed: Jan. 8, 2016

(65) Prior Publication Data
US 2017/0201610 A1    Jul. 13, 2017

(51) Int. Cl.
| | | |
|---|---|---|
| *H04M 1/60* | (2006.01) | |
| *H04W 68/02* | (2009.01) | |
| *H04W 4/02* | (2018.01) | |
| *G06F 3/16* | (2006.01) | |

(52) U.S. Cl.
CPC .......... *H04M 1/6083* (2013.01); *G06F 3/165* (2013.01); *H04W 4/025* (2013.01); *H04W 68/02* (2013.01)

(58) Field of Classification Search
CPC ............ H04M 1/6075; H04M 1/6041; H04M 1/6058; H04M 1/6083; G06F 3/165; H04W 4/008
See application file for complete search history.

(56) References Cited

U.S. PATENT DOCUMENTS

| | | | |
|---|---|---|---|
| 5,987,106 A | 11/1999 | Kitamura | |
| 2004/0151285 A1* | 8/2004 | Sychta | H04M 1/6091 379/88.16 |
| 2005/0221868 A1* | 10/2005 | Childress | H03G 3/342 455/569.2 |
| 2007/0049197 A1 | 3/2007 | Klein | |
| 2008/0112575 A1* | 5/2008 | Isobe | H03G 3/3026 381/104 |
| 2012/0284012 A1 | 11/2012 | Rodriguez et al. | |
| 2015/0266409 A1* | 9/2015 | Akiyama | B60Q 1/12 701/49 |
| 2016/0165031 A1* | 6/2016 | Gopinath | H04M 1/6091 455/569.2 |
| 2016/0229363 A1* | 8/2016 | Singer | G06F 17/00 |
| 2017/0103773 A1* | 4/2017 | Chowdhury | G10L 21/02 |

* cited by examiner

*Primary Examiner* — Julio R Perez
(74) *Attorney, Agent, or Firm* — Arent Fox, LLP (57) ABSTRACT

A method, an apparatus, and a computer program product for device control are provided. The apparatus determines that a user equipment (UE) connected to the apparatus receives a call. The apparatus determines a location of the UE. The apparatus adjusts a volume of at least one of a plurality of speakers based on the location of the UE and locations of the plurality of speakers while the UE receives the call.

24 Claims, 8 Drawing Sheets

SMART WAY OF CONTROLLING CAR AUDIO SYSTEM

BACKGROUND

Field

The present disclosure relates generally to communication systems, and more particularly, to a centralized control system.

Background

Centralized control systems are widely deployed to provide various features. The control system may be implemented in a specific space such as a room or an automobile. In one example, an entertainment system or an infotainment system may be implemented to control and manage available features. The control system may interact with a user device, and may exchange data with the user device. For example, the control system may provide various control functions to the user device to control the user device, and the user device may provide data such as multimedia data such that the control system can reproduce such multimedia data. Therefore, various uses and approaches may be explored to maximize the uses of the communication between the control system and the user device and enhance user experience.

SUMMARY

In an aspect of the disclosure, a method, a computer program product, and an apparatus are provided. The apparatus may be an apparatus. The apparatus determines that a user equipment (UE) connected to the apparatus receives a call. The apparatus determines a location of the UE. The apparatus adjusts a volume of at least one of a plurality of speakers based on the location of the UE and locations of the plurality of speakers while the UE receives the call.

In another aspect of the disclosure, an apparatus may be an apparatus for device control. The apparatus includes means for determining that a UE connected to the apparatus receives a call. The apparatus includes means for determining a location of the UE. The apparatus includes means for adjusting a volume of at least one of a plurality of speakers based on the location of the UE and locations of the plurality of speakers while the UE receives the call.

In another aspect of the disclosure, an apparatus may be an apparatus for device control. The apparatus includes a memory. The apparatus includes at least one processor coupled to the memory and configured to: determine that a UE connected to the apparatus receives a call, determine a location of the UE, and adjust a volume of at least one of a plurality of speakers based on the location of the UE and locations of the plurality of speakers while the UE receives the call.

In another aspect of the disclosure, a computer-readable medium storing computer executable code for device control is provided. The computer-readable medium comprises code for: determining that a UE connected to the apparatus receives a call, determining a location of the UE, and adjusting a volume of at least one of a plurality of speakers based on the location of the UE and locations of the plurality of speakers while the UE receives the call.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Centralized control systems (central systems) may be used to control various operations in a specific space such as a room or a vehicle interior. For example, a central system may be used to control a multimedia display, a sound volume, selection of data to reproduce, accessing radio stations, making telephone calls, etc. for a multimedia setup in a specific space. In one example, an infotainment system may be used to control a display and a sound in a car. In another example, a home theater control system may be used to control a television display and various speaker outputs. Further, for example, a central system may be connected to a user equipment (UE) such as a mobile device, a mobile phone, a tablet, a laptop, etc, so that the UE may send various information to the central system. In such an example, the UE may send audio data to the central system such that the central system may play the audio data. In another example, the central system may control the UE functions by sending control data to the UE.

The central system may communicate with the UE using various communication methods (e.g., wireless and/or wired) available. In one example, the central system may communicate with the UE via a local area network that may be wireless or wired. In another example, the central system may communicate with the UE via a radio frequency. In another example, the central system may communicate with the UEs using device-to-device communication. The device-to-device communications utilize a cellular communications system, such as for example, a wireless wide area network (WWAN). The infotainment system and the UEs may communicate together in device-to-device communication using the DL/UL WWAN spectrum. The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard.

A UE may be configured to receive a call. A central system may be configured to detect a telephone call or any other types of a voice call at a UE connected to the central system. For example, a central system may detect a telephone call on the UE and notify the user of the telephone call. A central system may also be configured to control volumes of speakers connected to the central system. In one use case, if a user in a specific space (e.g., a car, a room, etc.) receives a call on the user's mobile phone, the user may desire muting or reducing of the speaker volume, so that the user may talk on the mobile phone without interference from other sound. For example, if the user receives a call on the mobile phone while music is playing through the speakers in the specific space, the user may often request an operator of the central system to reduce the volume of the speakers, so that the user may be able to talk on the mobile phone without interference by the sound from the speakers. However, manually controlling the central system to reduce the volume of the speakers may be cumbersome. Further, reducing the volume of all speakers may not be advantageous for other users who are located distant from the user receiving the call and listening to sound from speakers located distant from the user. Thus, an automated approach to improve user experience when a call is received on a UE is desired.

Figure 1:
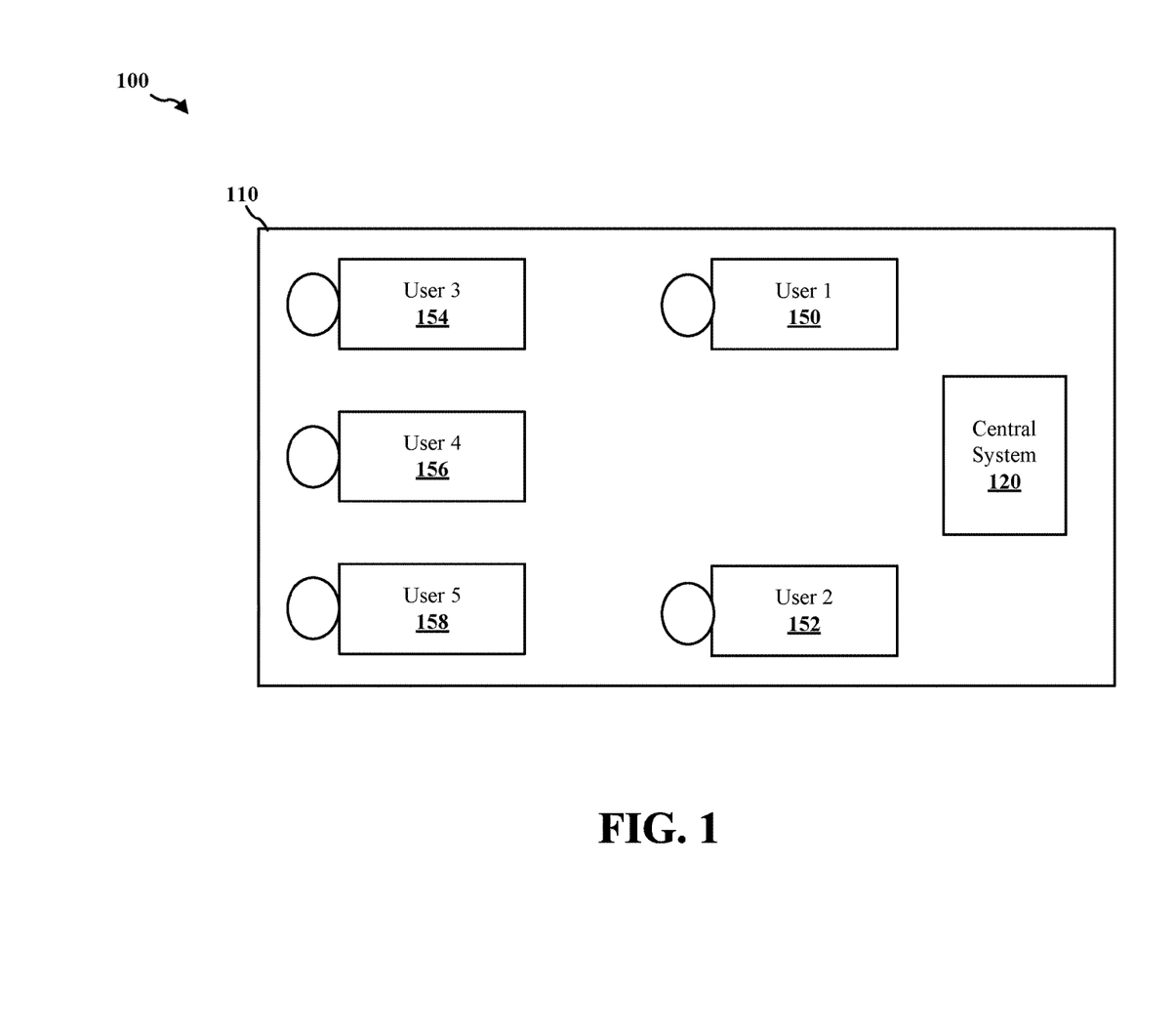
FIG. 1 is an example diagram illustrating several users in a specific space with a central system.

FIG. 1 is an example diagram 100 illustrating several users in a specific space with a central system. The specific space 110 may include a central system 120 controlling functions of multimedia devices (e.g., speakers) in the specific space 110. The specific space 110 may accommodate several people, such as User 1 150, User 2 152, User 3 154, user 4 156, and User 5 158. Several of the people in the specific space 110 may carry mobile devices such as mobile phones. If one user (e.g., User 3 154) receives a telephone call on the user's mobile phone while the central system 120 is playing sound through speakers, it may be beneficial for the user to mute or reduce the speaker volume. User 3 154 may ask a person (e.g., User 1 150 or User 2 152) close to the central system 120 to control the central system 120 to mute or to reduce the speaker volume.

According to the disclosure, a position of a mobile device (e.g., UE) that is receiving a call may be considered to improve user experience with the mobile device. In particular, based on the position of the mobile device receiving a call, a central system may change dynamics of an audio system connected to the central system such that a user who is receiving the call on the mobile device will have no or reduced interference by the audio system. The central system may be an infotainment system for the audio system in a specific space such an automobile, a room, a house, etc. The mobile devices may be connected to the central system using any of various approaches as described supra. The central system may be able to determine whether a mobile device connected to the central system is receiving a call or not. The call received by the mobile device may be any of various types of calls, such as a telephone call, a wireless call via internet or any other network connection, a video conferencing call, etc. When a user receives a call via the user's mobile device, the central system determines that the user's mobile device is receiving a call, and thus the central system may adjust volumes of various speakers of the audio system in the specific space, such that the user receiving the call via the mobile device experiences no or reduced interference by the audio system.

For example, when the central system determines that a mobile device is receiving a call, the central system may adjust volumes of speakers whose locations correspond to the location of the mobile device receiving a call. The central system may not reduce volumes of speakers whose locations do not correspond to the location of the mobile device receiving a call. The speakers whose locations correspond to the location of the mobile device may be the speakers that are in close proximity to the mobile device or may be the speakers that are closest to the mobile device. In one aspect, the central system may mute or reduce the volumes of one or more speakers that are located near the user's mobile device receiving the call, such that the user may communicate on the mobile device without interference from speakers. In such an aspect, the central system may not reduce the volumes of one or more speakers that are located far from the user's mobile device as much as the volumes of the one or more speakers located near the user's mobile device. In another aspect, the central system may reduce the volumes of speakers to different levels based on the locations of the speakers relative to the location of the mobile device receiving a call. For example, a volume of a speaker that is closest to the mobile device receiving a call may be reduced the most, whereas a volume of a speaker that is farthest from the mobile device receiving a call may be reduced the least.

In an aspect, the central system may cause the microphone sensitivity of the mobile device receiving a call to be adjusted if the central system determines that the speakers are currently playing sound. For example, if the speakers are currently playing the sound, the microphone sensitivity of the mobile device receiving the call may be increased to be able to capture the user's voice more easily.

In an aspect, the central system may be configured to detect a mobile device that is connected to a headset (e.g., a headphone), and may adjust the speaker volumes based on information about whether a mobile device is connected to a headset. In one example, when a first mobile device is receiving a call, the central system may reduce a volume of a speaker that is closest to the first mobile device to a first level if a second mobile device is connected to a headset, while the central system may reduce the volume of the speaker closest to the first mobile device to a second level lower than the first level if the second mobile device is not connected to a headset. In such a case, if a user of the second mobile device is listening to sound from the second mobile device using a headset, it may be assumed that the user of the second mobile device is not listening to sound from the speaker, and thus reducing the volume of the speaker closest to the first mobile device to a very low level may not affect the experience of the user using the headset, while enhancing the experience of the user receiving the call. In one example, when a first mobile device is receiving a call, the central system may completely mute a speaker that is closest to the second mobile device if the second mobile device is connected to a headset, while the central system may lower the volume of the speaker closest to the second mobile device without muting if the second mobile device is not connected to a headset. In such an example, if a user is listening to sound from the second mobile device using a headset, it may be assumed that the user is not listening to sound from the speaker, and thus completely muting the speaker closest to the second mobile device may not affect the experience of the user using the headset on the second mobile device, while enhancing the experience of the user receiving the call on the first mobile device.

In one aspect, several external microphones at different locations within the specific space may be implemented with the central system. In such an aspect, the central system turns on an external microphone that is the closest external microphone to the mobile device receiving a call, such that the user of the mobile device may speak to the external microphone to communicate. In such a case, the central system may turn off other external microphones that are farther away from the mobile device receiving the call.

The central system may determine the locations of the mobile devices in the specific space by any of various approaches for detecting the location of the mobile devices. The locations of the mobile devices may be locations relative to the locations of the speakers. In one aspect, the central system may implement location sensors to determine a location of a mobile device within the specific space. For example, wireless tag detectors connected to the central system may be located at various locations within the specific space, and thus may be assigned to respective locations within the specific space. When a wireless tag detector detects a wireless tag in a mobile device, the central system may associate the mobile device with the location of the wireless tag detector. In such a case, when the mobile device receives a call, the apparatus mutes or reduces volumes of speakers near the location of the wireless tag detector that detects the wireless tag of the mobile device. The wireless tag may be a radio frequency identification (RFID) tag, for example. It is noted that locations of the speakers and locations of external microphones may be predefined at the central system. In one aspect, the locations of the speakers and/or the locations of the external microphones may be predefined relative to locations of the wireless tag detectors.

The central system may produce a notification of a call received by a mobile device. For example, the central system may provide the notification by outputting (e.g., either via a speaker or on a display) words that describe that the particular mobile device is receiving a call. The central system may also display locations of the UEs in the specific space.

Figure 2:
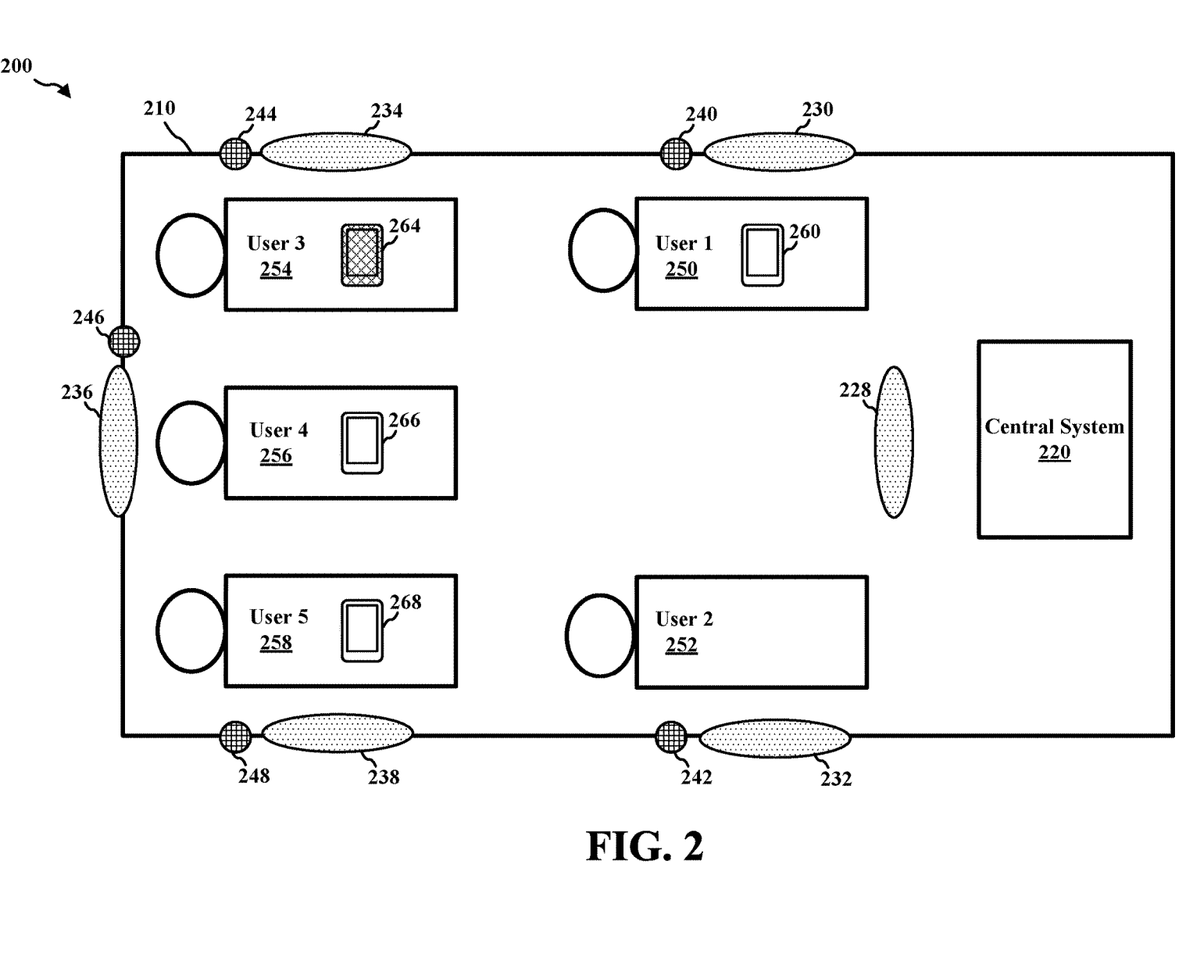
FIG. 2 is an example diagram illustrating several users with mobile devices in a specific space having a central system.

FIG. 2 is an example diagram 200 illustrating several users with mobile devices in a specific space having a central system. The specific space 210 may be a car or a room, for example. The specific space 210 includes a central system 220 that is connected to a central speaker 228 and first to fifth speakers 230, 232, 234, 236, and 238, such that the central system 220 may be able to control audio outputs to such speakers connected to the central system 220. The specific space 210 may include first to fifth microphones 240, 242, 244, 246, and 248 that are connected to the central system. The first to fifth microphones 240, 242, 244, 246, and 248 may be used to help a user communicate when a user receives a call on a UE. The specific space 210 may accommodate several people, such as User 1 250, User 2 252, User 3 254, User 4 256, and User 5 258. User 1 250, User 3 254, User 4 256, and User 5 258 may have UEs 260, 264, 266, and 268, respectively. In the example diagram 200, User 2 252 does not carry a UE.

Figure 3A:
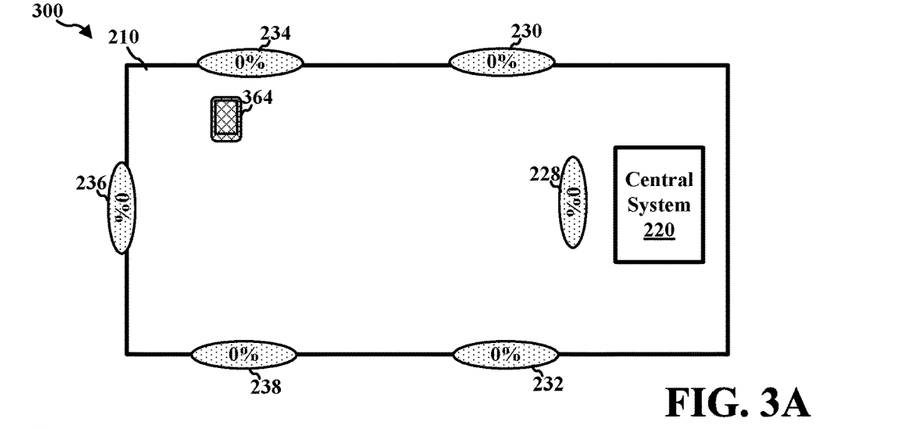
FIGS. 3A-3C are example diagrams illustrating various situations for adjusting a speaker volume.
Figure 3B:
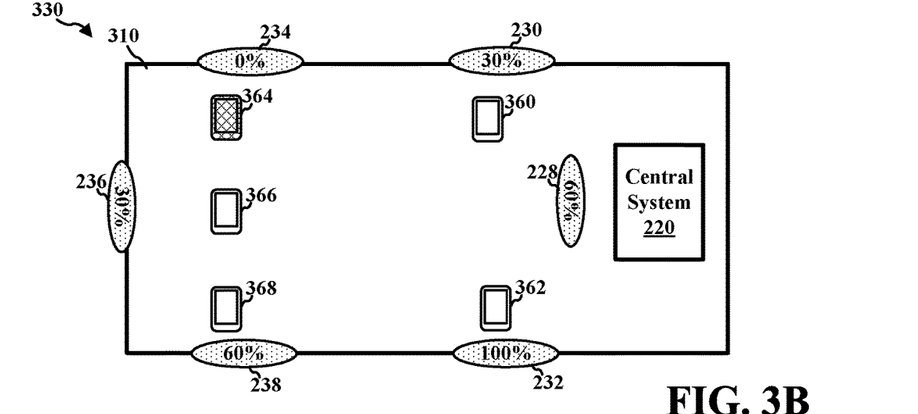
Figure 3C:
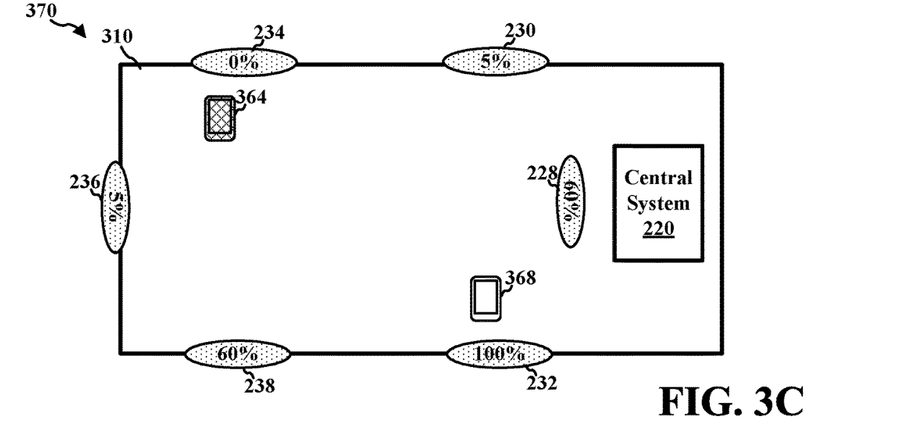

The central system 220 may determine locations of the UEs 260, 264, 266, and 268, by using location sensors in various locations within the specific space 210. The central system 220 may have information on locations of the central speaker 228 and the first to fifth speakers 230, 232, 234, 236, and 238. If User 3 254 is receiving a call via the UE 264, then the central system 220 may determine that the location of the third speaker 234 corresponds to the location of the UE 264 because the central system 220 determines that the third speaker 234 is the closest speaker to the UE 264 within the specific space 210. Subsequently, the central system 220 may mute the third speaker 234 or reduce the volume of the third speaker 234 to a lowest level, and may also reduce the volume of the other speakers (e.g., the central speaker 228, the first speaker 230, the second speaker 232, the fourth speaker 236, the fifth speaker 238), such that User 3 254 may communicate on the UE 264 with little or no interference. In an aspect, the central system 220 may adjust the speakers 228, 230, 232, 234, 236, and 238 to different levels based on the locations of the speakers 228, 230, 232, 234, 236, and 238 with respect to the location of the UE 264 receiving the call. For example, when the UE 264 receives the call, the central system 220 mutes the third speaker 234 that is the closest speaker to User 3 254, and reduces volumes of the second closest speakers (e.g., the first speaker 230 and the fourth speaker 236) to a first level, reduces the volumes of the third closets speakers (e.g., the central speaker 228 and the fifth speaker 238) to a second level that is higher than the first level, and reduces the volume of the farthest speaker (e.g., the second speaker 232) to a third level higher than the second level. More detailed examples illustrating such feature are illustrated in FIGS. 3A-3C infra. In one aspect, even when User 3 254 is receiving a call on the UE 264, the central system 220 may not adjust volumes of the speakers 228, 230, 232, 234, 236, and 238 if the speaker volumes are already very small (e.g., below a certain threshold).

In one aspect, the central system 220 may determine that the third microphone 244 is closest to the UE 264 receiving the call, and subsequently may turn on the third microphone 244 to help User 3 254 communicate on the UE 264 during the call. In such a case, the central system 220 may turn off other microphones 240, 242, 246, and 248 that are farther away from the UE 264 than the third microphone 244. When the UE 264 receives a call, instead of or in addition to speaking to the UE 264, User 3 254 may speak on the third microphone 244 such that the central system 220 may use the third microphone 244 to capture the voice of User 3 254 and send the voice to the UE 264.

The central system 220 may be configured to detect which UE has a head set connected. In one example, if the central system 220 determines that a headphone is connected to the UE 268 of User 5 258, then when User 3 254 receives a call via the UE 264, the system may completely mute the fourth speaker 238 that is the closest speaker to User t 258, because it may be assumed that User 5 258 is using the head set, and is not listening to sound from the speaker 238. In another example, if the central system 220 determines that a headphone is connected to the UEs 260, 266, and 268, when the UE 264 is receiving a call, the central system 220 may mute all speakers. If the central system 220 determines that none of the UEs 260, 266, and 268 are connected to a headphone, the central system 220 may reduce volumes of the speakers at different levels as discussed above when the UE 264 is receiving a call.

FIGS. 3A-3C are example diagrams illustrating various situations for adjusting a speaker volume. As discussed supra, the central system may adjust the volumes of the speakers within a specific space based on a number of UEs and locations of the UEs. Thus, FIGS. 3A-3C illustrate various examples with different numbers of UE and different location arrangements of the UE. Similarly to FIG. 2, FIGS. 3A-3C illustrate the specific space 210, and the central speaker 228 and the first to fifth speakers 230, 232, 234, 236, and 238 connected to the central system 220. The microphones 240, 242, 244, 246, and 248 are not shown in FIGS. 3A-3C, for simplicity.

FIG. 3A is an example diagram 300 illustrating a case where a single user with a mobile device is present in a specific space. In the example diagram 300, only UE 364 is present within the specific space 210. Because the central system 220 detects only the UE 364, when the UE 364 receives a call, the central system 220 completely mutes all speakers 228, 230, 232, 234, 236, and 238 (e.g., to 0% of the audio output). The central system 220 completely mutes all speakers when the UE 364 receives the call because there is no other user than the user of the UE 364 that is listening to sound from the speakers 228, 230, 232, 234, 236, and 238.

FIG. 3B is an example diagram 330 illustrating a case where five users with respective mobile devices are present in a specific space. In the example diagram 330, because five users with respective UEs are spread out in the specific space 310, the speakers 228, 230, 232, 234, 236, and 238 may be adjusted to different levels. In the example diagram 330, the central system 220 determines that the UE 364 is receiving a call. Then, the central system 220 reduces a volume of the third speaker 234 that is closest to the UE 364 to a first level (e.g., to 0% of the audio output to mute the third speaker 234), and adjusts the second closest speakers (e.g., the first speaker 230 and the fourth speaker 236) to the UE 364 to a second level (e.g., 30% of the audio output) higher than the first level. Further, the central system 220 adjusts the third closets speakers (e.g., the central speaker 228 and the fifth speaker 238) to the UE 364 to a third level (e.g., 60% of the audio output) that is higher than the second level. The central system 220 may not adjust the farthest speaker (e.g., the second speaker 232) from the UE 364 and thus may maintain the volume of the farthest speaker the same (e.g., at 100% of the audio output).

FIG. 3C is an example diagram 370 illustrating a case where two users with respective mobile devices are present in a specific space. In the example diagram 370, the central system 220 determines that there is no UE within proximity of the UE 364, and a UE 368 is distant from the UE 364. Thus, when the UE 364 receives a call, the central system 220 completely mutes the third speaker 234 that is closest to the UE 364 (e.g., to 0% of the audio output). Further, the central system 220 detects no other UEs close to the first speaker 230 and the fourth speaker 236, and thus reduces the first speaker 230 and the fourth speaker 236 to a first level (e.g., to 5% of the audio output or alternatively to 0% of the audio output). The central system 220 detects the UE 368 that is close to the central speaker 228, the fifth speaker 238, and the second speaker 232, and thus does not completely mute the central speaker 228, the fifth speaker 238, and the second speaker 232. Instead, the central system 220 adjusts the central speaker 228 and the fifth speaker 238 to a second level (e.g., to 60% of the audio output) higher than the first level, and maintains the volume of the second speaker 232 that is farthest from the UE 364 receiving a call (e.g., at 100% of the audio output), as the central speaker 228 and the fifth speaker 238 are closer to the UE 364 than the second speaker 232.

Figure 4:
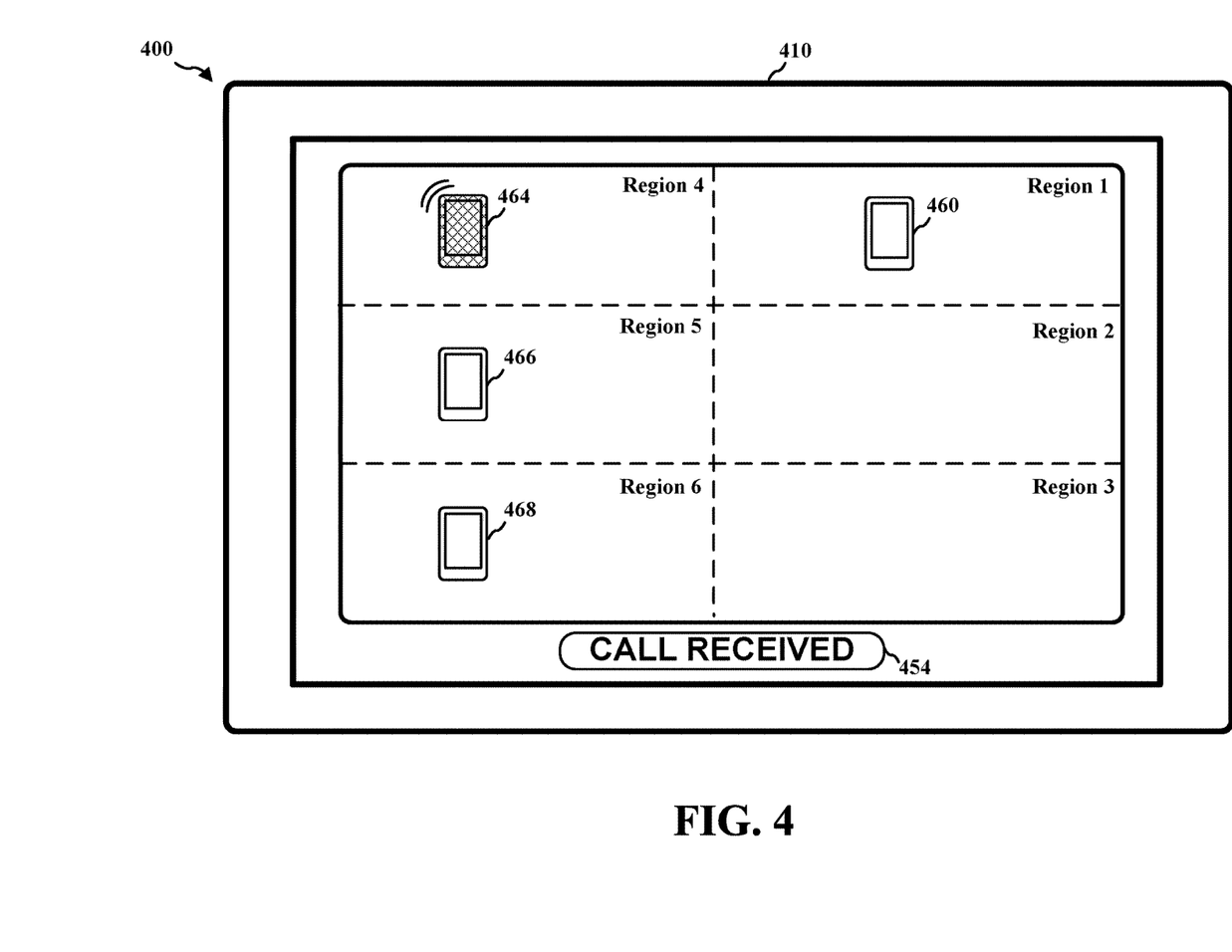
FIG. 4 is an example diagram illustrating a display of a central system.

FIG. 4 is an example diagram 400 illustrating a display of a central system. The central system may include a display device 410 to display various features for the central system. The example diagram 400 illustrates the display device 410 for a case illustrated in FIG. 2. In the example diagram 400, the display device 410 displays six different regions such as Region 1, Region 2, Region 3, Region 4, Region 5, and Region 6, within a specific space (e.g., the specific space 210). In an aspect, six different location sensors may be located in Region 1, Region 2, Region 3, Region 4, Region 5, and Region 6, respectively, such that the location sensors may be able to detect a UE. For example, as discussed supra, six wireless tag detectors may be respectively located in Region 1, Region 2, Region 3, Region 4, Region 5, and Region 6, such that the wireless tag detectors may detect a wireless tag in a UE. The display device 410 illustrates an UE indication 460 for the UE 260 located in Region 1, a UE indication 464 for the UE 264 located in Region 4, a UE indication 466 for the UE 266 located in Region 5, and a UE indication 468 for the UE 268 located in Region 6. The display device 410 also illustrates that no UE is present in Region 2 and Region 3 because no UE indications are displayed in Region 2 and Region 3. The display device 410 illustrates that the UE 264 is receiving a call, by highlighting the UE indication 464 for the UE 264, and displays a notification 454 to indicate that a call is received.

Figure 5:
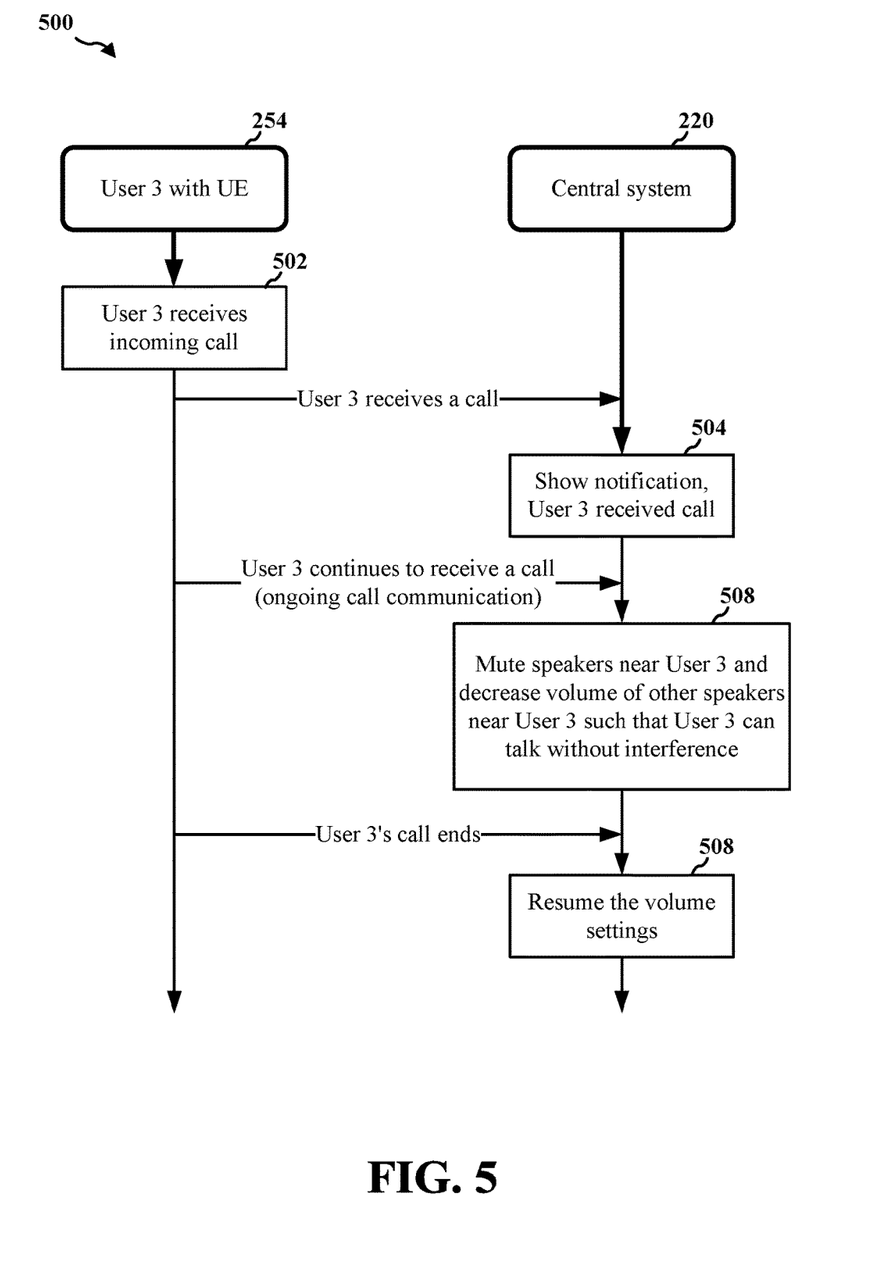
FIG. 5 is an example flow diagram according to an aspect of the disclosure.

FIG. 5 is an example flow diagram 500 according to an aspect of the disclosure. The example flow diagram 500 describes the case illustrated in FIG. 2. When User 3 254 receives a call using the UE 264 at 502, the central system 220 shows a notification that the UE 264 of User 3 254 is receiving a call, at 504. At 508, because the UE 264 of User 3 254 continues to receive a call, the central system 220 mutes speakers (e.g., third speaker 234) near UE 264 of User 3 254, and decreases volumes of other speakers near UE 264 of User 3 254, such that User 3 254 can communicate on UE 264 without interference. At 508, when the call with the UE 264 of User 3 254 ends, the central system 220 resumes the volume settings of the speakers back to the level before the UE 264 of User 3 254 received a call.

Figure 6:
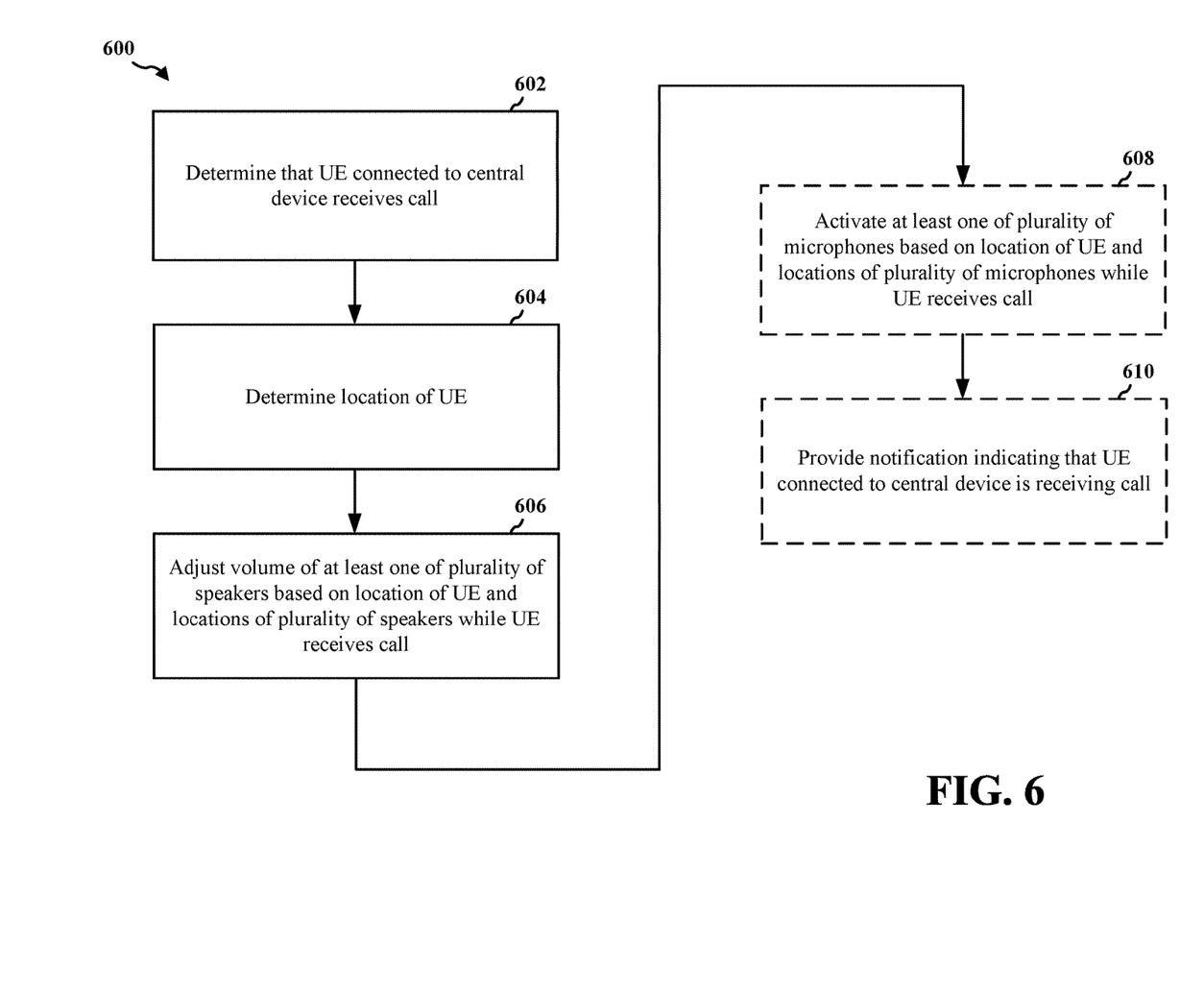
FIG. 6 is a flowchart of a method of wireless communication.

FIG. 6 is a flowchart 600 of a method of wireless communication. The method may be performed by an apparatus (e.g., the central system 120, the apparatus 702/702'). At 602, the apparatus determines that a user equipment (UE) connected to the apparatus receives a call. At 604, the apparatus determines a location of the UE. At 606, the apparatus adjusts a volume of at least one of a plurality of speakers based on the location of the UE and locations of the plurality of speakers while the UE receives the call. In an aspect, the apparatus adjusts the volume by reducing the volume of the at least one of the plurality of speakers while the UE receives the call, a location of the at least one of the plurality of speakers corresponding to the location of the UE. For example, as discussed supra, when a user receives a call via the user's mobile device, the central system determines that the user's mobile device is receiving a call, and thus the central system may adjust volumes of various speakers of the audio system in the specific space. For example, as discussed supra, when the central system determines that a mobile device is receiving a call, the central system may adjust volumes of speakers whose locations correspond to the location of the mobile device receiving a call. For example, as discussed supra, the central system may determine the locations of the mobile devices relative to the locations of the speakers in the specific space.

In an aspect, the location of the UE is a location relative to the locations of the plurality of speakers. For example, as discussed supra, the central system may determine the locations of the mobile devices in the specific space by any of various approaches for detecting the location of the mobile devices. For example, as discussed supra, the locations of the mobile devices may be locations relative to the locations of the speakers. In an aspect, the location of the UE is determined based on detection of a wireless tag of the UE, the detection of the wireless tag indicating a specific location. For example, as discussed supra, when a wireless tag detector detects a wireless tag in a mobile device, the central system may associate the mobile device with the location of the wireless tag detector.

In an aspect, the adjusting of the volume of the at least one of the plurality of speakers is further based on a location of another UE connected to the apparatus. In such an aspect, the apparatus adjusts the volume by reducing a volume of at least one of the plurality of speakers that does not correspond to the location of the another UE, and maintaining a volume of at least another one of the plurality of speakers that corresponds to the location of the another UE. For example, as discussed supra, in FIG. 3C, when the UE 364 receives a call, the central system 220 completely mutes the third speaker 234 that is closest to the UE 364 (e.g., to 0% of the audio output). For example, as discussed supra, in FIG. 3C, the central system 220 adjusts the central speaker 228 and the fifth speaker 238 to a second level (e.g., to 60% of the audio output) higher than the first level, and maintains the volume of the second speaker 232 that is farthest from the UE 364 receiving a call (e.g., at 100% of the audio output), as the central speaker 228 and the fifth speaker 238 are closer to the UE 364 than the second speaker 232.

In an aspect, the adjusting of the volume of the at least one of the plurality of speakers is further based on whether another UE connected to the apparatus is connected to a headphone. In such an aspect, the apparatus adjusts the volume by adjusting the volume to a first level when another UE connected to the apparatus is connected to a headphone, and adjusting the volume to a second level when another UE connected to the apparatus is not connected to a headphone, the second level being lower than the first level. For example, as discussed supra, for example, when a first mobile device is receiving a call, the central system may reduce a volume of a speaker that is closest to the first mobile device to a first level if a second mobile device is connected to a headset, while the central system may reduce the volume of the speaker closest to the first mobile device to a second level lower than the first level if the second mobile device is not connected to a headset.

At 608, the apparatus may activate at least one of a plurality of microphones based on the location of the UE and locations of the plurality of microphones while the UE receives the call. For example, as discussed supra, the central system turns on an external microphone that is the closest external microphone to the mobile device receiving a call, such that the user of the mobile device may speak to the external microphone to communicate. For example, as discussed supra, the central system may turn off other external microphones that are farther away from the mobile device receiving the call. At 610, the apparatus may provide a notification indicating that the UE connected to the apparatus is receiving a call. For example, as discussed supra, the central system may provide the notification by outputting (e.g., either via a speaker or on a display) words that describe that the particular mobile device is receiving a call.

Figure 7:
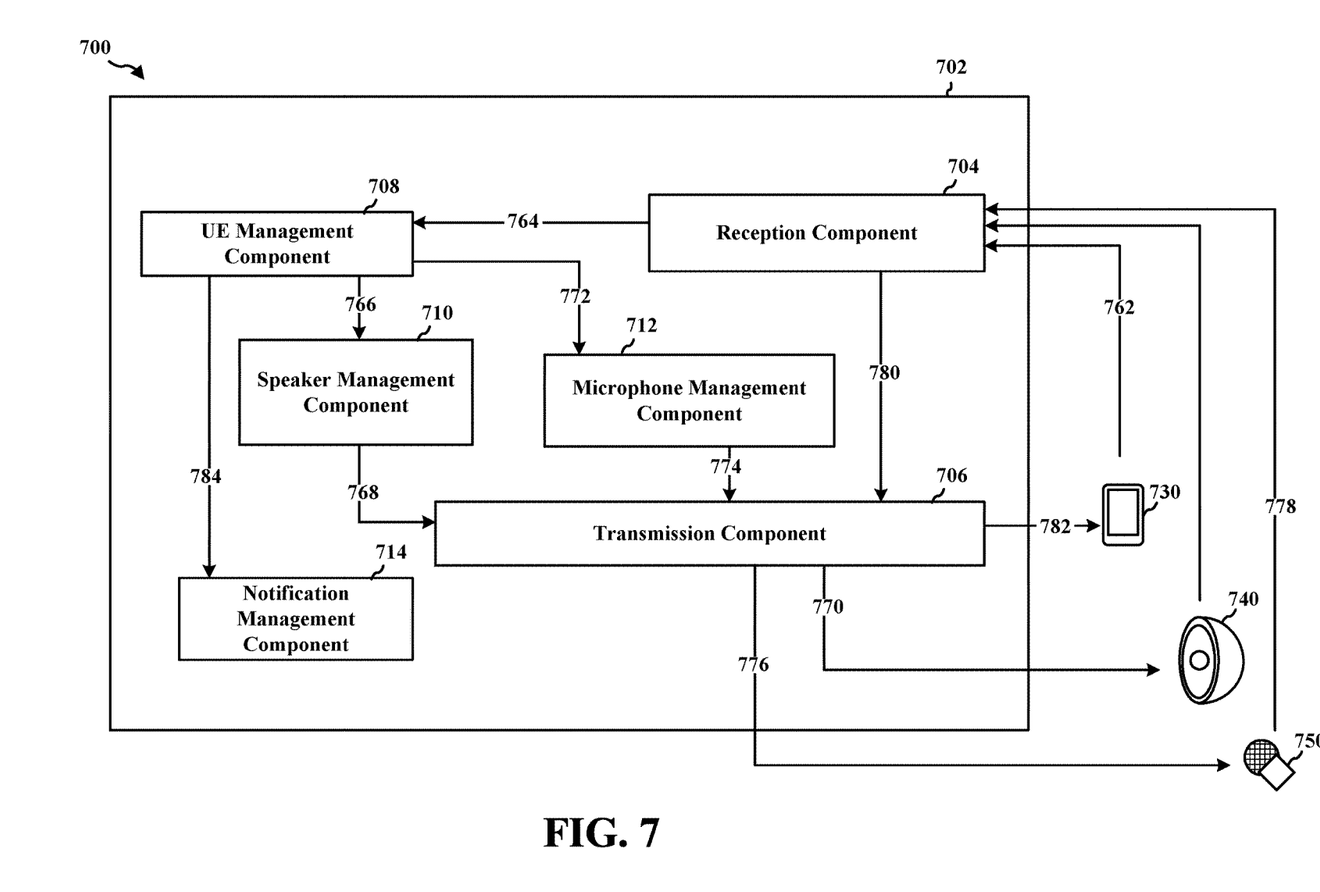
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be an apparatus. The apparatus includes a reception component 704, a transmission component 706, a UE management component 708, a speaker management component 710, a microphone management component 712, and a notification management component 714.

The UE management component 708, via the reception component 704, determines that a UE 730 connected to the apparatus receives a call, at 762 and 764. The UE management component 708, via the reception component 704, determines a location of the UE 730, at 764. The speaker management component 710, via the UE management component 708 and the transmission component 706, adjusts at 766, 768, and 770 a volume of at least one of a plurality of speakers (e.g., the speakers 740) based on the location of the UE 730 and locations of the plurality of speakers while the UE 730 receives the call.

In an aspect, the speaker management component 710 adjusts the volume by reducing the volume of the at least one of the plurality of speakers while the UE 730 receives the call, a location of the at least one of the plurality of speakers corresponding to the location of the UE 730. In an aspect, the location of the UE 730 is a location relative to the locations of the plurality of speakers. In an aspect, the location of the UE 730 is determined based on detection of a wireless tag of the UE 730, the detection of the wireless tag indicating a specific location.

In an aspect, the speaker management component 710 adjusts the volume of the at least one of the plurality of speakers further based on a location of another UE connected to the apparatus. In an aspect, the speaker management component 710 adjusts the volume by reducing a volume of at least one of the plurality of speakers that does not correspond to the location of the another UE, and maintaining a volume of at least another one of the plurality of speakers that corresponds to the location of the another UE.

In an aspect, the speaker management component 710 adjusts the volume of the at least one of the plurality of speakers further based on whether another UE connected to the apparatus is connected to a headphone. In such an aspect, the speaker management component 710 adjusts the volume by adjusting the volume to a first level when another UE connected to the apparatus is connected to a headphone, and adjusting the volume to a second level when another UE connected to the apparatus is not connected to a headphone, the second level being lower than the first level.

In an aspect, the microphone management component 712, via the UE management component 708 and the transmission component 706, activates at least one of a plurality of microphones (e.g., microphones 750) based on the location of the UE 730 and locations of the plurality of microphones while the UE receives the call, at 772, 774, and 776. The voice captured at the microphone may be sent to the reception component 704 at 778 and may be relayed to the UE 730 receiving a call via the transmission component 706, at 780 and 782. In an aspect, the notification management component 714, via the UE management component 708, provides a notification indicating that the UE 730 connected to the apparatus is receiving a call, at 784.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
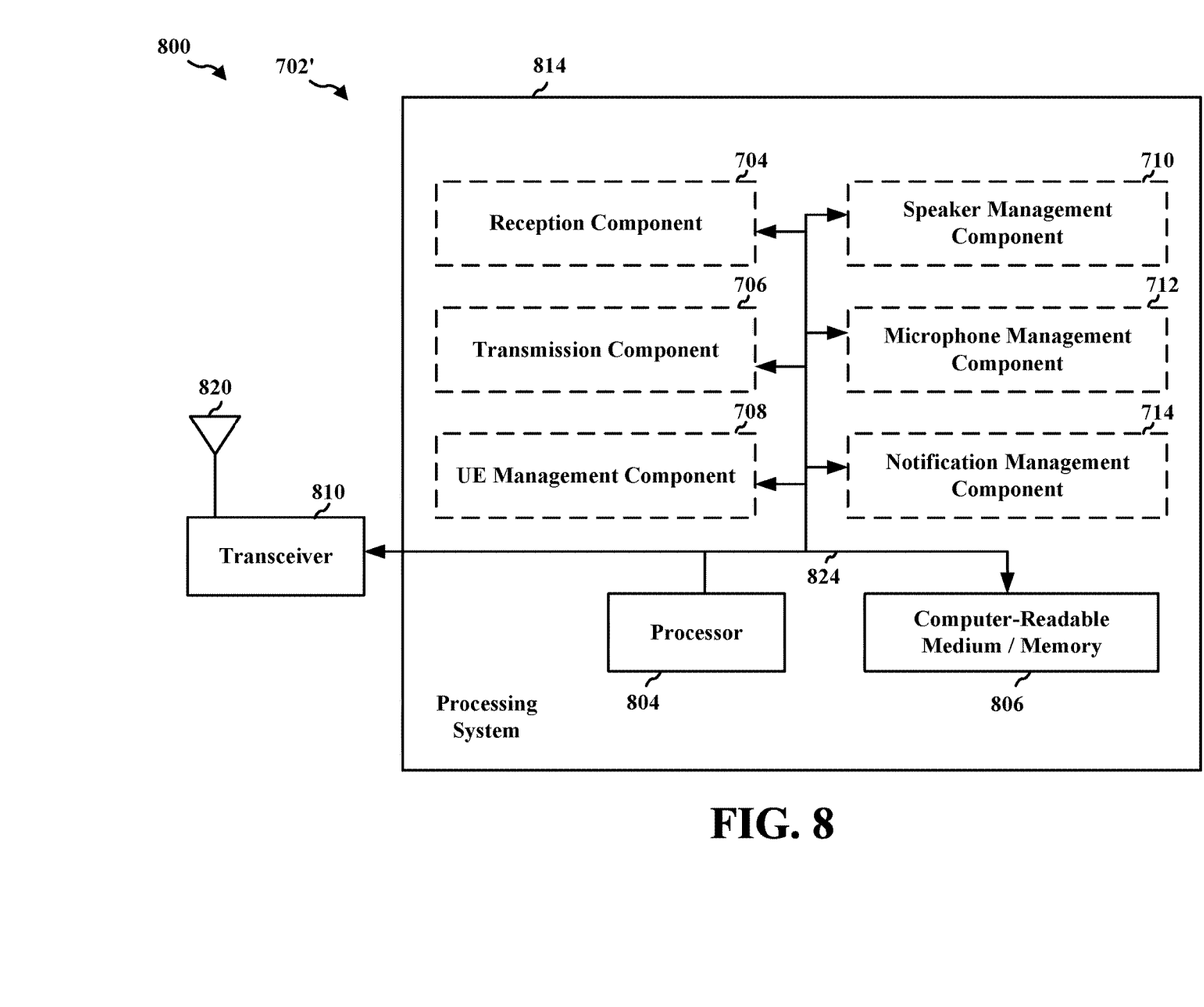
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710. 712, and 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the components 704, 706, 708, 710. 712, 714. The components may be software components running in the processor 804, resident/stored in the computer readable medium/memory 806, one or more hardware components coupled to the processor 804, or some combination thereof.

In one configuration, the apparatus 702/702' for device control includes means for determining that a UE connected to the apparatus 702/702' receives a call, means for determining a location of the UE, and means for adjusting a volume of at least one of a plurality of speakers based on the location of the UE and locations of the plurality of speakers while the UE receives the call. In an aspect, the means for adjusting the volume is configured to reduce the volume of the at least one of the plurality of speakers while the UE receives the call, a location of the at least one of the plurality of speakers corresponding to the location of the UE. In an aspect, the means for adjusting the volume of the at least one of the plurality of speakers is configured to adjust the volume of the at least one of the plurality of speakers further based on a location of another UE connected to the apparatus 702/702'. In an aspect, the means for adjusting the volume is configured to: reduce a volume of at least one of the plurality of speakers that does not correspond to the location of the another UE, and maintain a volume of at least another one of the plurality of speakers that corresponds to the location of the another UE. In an aspect, the means for adjusting the volume of the at least one of the plurality of speakers is configured to adjust the volume of the at least one of the plurality of speakers further based on whether another UE connected to the apparatus 702/702' is connected to a headphone. In an aspect, the means for adjusting the volume is configured to: adjust the volume to a first level if another UE connected to the apparatus 702/702' is connected to a headphone, and adjust the volume to a second level if another UE connected to the apparatus 702/702' is not connected to a headphone, the second level being lower than the first level. In an aspect, the apparatus 702/702' further includes means for activating at least one of a plurality of microphones based on the location of the UE and locations of the plurality of microphones while the UE receives the call. In an aspect, the apparatus 702/702' further includes means for providing a notification indicating that the UE connected to the apparatus 702/702' is receiving a call.

The aforementioned means may be one or more of the aforementioned components of the apparatus 702 and/or the processing system 814 of the apparatus 702' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of device control by an apparatus, comprising:
   determining that a user equipment (UE) connected to the apparatus receives a call;
   determining a location of the UE;
   determining another UE connected to the apparatus is connected to a headphone; and
   reducing a volume of at least one of a plurality of speakers closest to the location of the UE based on the determining the another UE is connected to the headphone while the UE receives the call.

2. The method of claim 1,
   wherein the volume of the at least one of the plurality of speakers closest to the location of the UE is reduced to a second level when the another UE is unconnected to the headphone, the second level being different from a first level to which the volume of the at least one of the plurality of speakers closest to the location of the UE is reduced when the another UE is connected to the headphone.

3. The method of claim 2, further comprising, when determining that the another UE is unconnected to the headphone:
   determining the location of the another UE; and
   adjusting another volume of another speaker of the plurality of speakers based on the location of the another UE, wherein the volume of the at least one of the plurality of speakers is differently adjusted than the another volume of the another speaker.

4. The method of claim 1, wherein the location of the UE is a location relative to the locations of the plurality of speakers.

5. The method of claim 1, wherein the location of the UE is determined based on detection of a wireless tag of the UE, the detection of the wireless tag indicating a specific location.

6. The method of claim 1, wherein the adjusting of the volume comprises:
   reducing a volume of at least one of the plurality of speakers that does not correspond to the location of the another UE; and
   maintaining a volume of at least another one of the plurality of speakers that corresponds to a location of the another UE.

7. The method of claim 1, further comprising:
   activating at least one of a plurality of microphones based on the location of the UE and locations of the plurality of microphones while the UE receives the call.

8. The method of claim 1, further comprising:
   providing a notification indicating that the UE connected to the apparatus is receiving a call.

9. An apparatus for device control, comprising:
   means for determining that a user equipment (UE) connected to the apparatus receives a call;
   means for determining a location of the UE;
   means for determining another UE connected to the apparatus is connected to a headphone; and
   means for reducing a volume of at least one of a plurality of speakers closest to the location of the UE based on the determining the another UE is connected to the headphone while the UE receives the call.

10. The apparatus of claim 9,
    wherein the volume of the at least one of the plurality of speakers closest to the location of the UE is reduced to a second level when the another UE is unconnected to the headphone, the second level being different from a first level to which the volume of the at least one of the plurality of speakers closest to the location of the UE is reduced when the another UE is connected to the headphone.

11. The apparatus of claim 10, further comprising:
    means for determining the location of the another UE when the another UE is unconnected to the headphone; and
    means for adjusting another volume of another speaker of the plurality of speakers based on the location of the another UE when the another UE unconnected to the headphone, wherein the volume of the at least one of the plurality of speakers is differently adjusted than the another volume of the another speaker.

12. The apparatus of claim 9, wherein the location of the UE is a location relative to the locations of the plurality of speakers.

13. The apparatus of claim 9, wherein the location of the UE is determined based on detection of a wireless tag of the UE, the detection of the wireless tag indicating a specific location.

14. The apparatus of claim 9, wherein the means for adjusting the volume is configured to;
    reduce a volume of at least one of the plurality of speakers that does not correspond to the location of the another UE; and
    maintain a volume of at least another one of the plurality of speakers that corresponds to the location of the another UE.

15. The apparatus of claim 9, further comprising:
    means for activating at least one of a plurality of microphones based on the location of the UE and locations of the plurality of microphones while the UE receives the call.

16. The apparatus of claim 9, further comprising:
    means for providing a notification indicating that the UE connected to the apparatus is receiving a call.

17. An apparatus for device control, comprising:
  a memory; and
  at least one processor coupled to the memory and configured to:
    determine that a user equipment (UE) connected to the apparatus receives a call;
    determine a location of the UE;
    determine another UE connected to the apparatus is connected to a headphone; and
    reduce a volume of at least one of a plurality of speakers closest to a location of the UE based on the determination that the another UE is connected to the phone while the UE receives the call.

18. The apparatus of claim 17, wherein the volume of the at least one of the plurality of speakers closest to the location of the UE is reduced to a second level when the another UE is unconnected to the headphone, the second level being different from a first level to which the volume of the at least one of the plurality of speakers closest to the location of the UE is reduced when the another UE is connected to the headphone.

19. The apparatus of claim 18, wherein the at least one processor is further configured to:
    determine the location of the another UE when the another UE is unconnected to the headphone; and
    adjust another volume of another speaker of the plurality of speakers based on the location of the another UE when the another UE is unconnected to the headphone, wherein the volume of the at least one of the plurality of speakers is differently adjusted than the another volume of the another speaker.

20. The apparatus of claim 17, wherein the location of the UE is a location relative to the locations of the plurality of speakers.

21. The apparatus of claim 17, wherein the at least one processor configured to adjust the volume is configured to:
    reduce a volume of at least one of the plurality of speakers that does not correspond to the location of the another UE; and
    maintain a volume of at least another one of the plurality of speakers that corresponds to the location of the another UE.

22. The apparatus of claim 17, wherein the at least one processor is further configured to:
    activate at least one of a plurality of microphones based on the location of the UE and locations of the plurality of microphones while the UE receives the call.

23. The apparatus of claim 17, wherein the at least one processor is further configured to:
    provide a notification indicating that the UE connected to the apparatus is receiving a call.

24. A non-transitory computer-readable medium storing computer executable code for device control by an apparatus, comprising code to:
    determine that a user equipment (UE) connected to the apparatus receives a call;
    determine a location of the UE;
    determine another UE connected to the apparatus is connected to a headphone; and
    reduce a volume of at least one of a plurality of speakers closest to the location of the UE based on the determination that the another UE is connected to the headphone while the UE receives the call.

* * * * *